(12) United States Patent
Bujewicz et al.

(10) Patent No.: US 11,306,747 B2
(45) Date of Patent: Apr. 19, 2022

(54) SERVOVALVES

(71) Applicant: Hamilton Sundstrand Corporation, Charlotte, NC (US)

(72) Inventors: Maciej Bujewicz, Wroclaw (PL); Maciej Zak, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/533,836

(22) Filed: Aug. 7, 2019

(65) Prior Publication Data
US 2020/0096016 A1 Mar. 26, 2020

(30) Foreign Application Priority Data

Sep. 26, 2018 (EP) ..................... 18461614

(51) Int. Cl.
*F15B 13/04* (2006.01)
*F15B 5/00* (2006.01)

(52) U.S. Cl.
CPC .......... *F15B 13/0401* (2013.01); *F15B 5/003* (2013.01); *F15B 2211/41536* (2013.01); *Y10T 137/86598* (2015.04)

(58) Field of Classification Search
CPC ................. F15B 13/0401; F15B 5/003; F15B 2211/41536; F15B 13/0438; Y10T 137/0486; Y10T 137/86598; F15C 3/14
USPC ......................................... 137/15.17, 625.62
See application file for complete search history.

(56) References Cited

U.S. PATENT DOCUMENTS

| | | | | |
|---|---|---|---|---|
| 2,824,574 A | * | 2/1958 | Pace | F15B 13/0438 137/625.62 |
| 2,961,002 A | * | 11/1960 | Gordon | F15B 13/0438 137/625.62 |
| 3,015,343 A | | 1/1962 | Gardiner et al. | |
| 3,318,320 A | | 5/1967 | Lloyd | |
| 3,323,090 A | * | 5/1967 | O'Brien | H01F 7/14 335/230 |
| 3,817,150 A | * | 6/1974 | Cox | F15B 9/12 91/186 |
| 4,538,633 A | * | 9/1985 | Stevens | F15B 13/0438 137/625.62 |
| 4,617,966 A | * | 10/1986 | Nicholson | H01F 7/14 137/625.62 |
| 4,742,322 A | | 5/1988 | Johnson et al. | |
| 4,800,924 A | | 1/1989 | Johnson | |
| 5,070,898 A | | 12/1991 | Jagodzinski et al. | |
| 5,282,570 A | | 2/1994 | Johnson et al. | |

(Continued)

FOREIGN PATENT DOCUMENTS

WO 2017058238 A1 4/2017

OTHER PUBLICATIONS

Extended European Search Report for International Application No. 18461614.2 dated Apr. 3, 2019, 9 pages.

*Primary Examiner* — William M McCalister
(74) *Attorney, Agent, or Firm* — Cantor Colburn LLP (57) ABSTRACT

A single stage flapper type servovalve comprises a valve housing comprising a bore, a pair of opposed nozzles arranged in the bore and a flapper element arranged between the pair of nozzles. The valve housing further comprises a plurality of fluid ports for communicating a working fluid to and from the nozzles and in fluid communication with the housing bore. The valve housing and the nozzles are both made from a stainless steel material.

6 Claims, 5 Drawing Sheets

(56) References Cited

U.S. PATENT DOCUMENTS 5,524,525 A     6/1996   Nikkel et al.
2017/0299083 A1*   10/2017   Gassman ............ F16K 31/0624

* cited by examiner

SERVOVALVES

FOREIGN PRIORITY

This application claims priority to European Patent Application No. 18461614.2 filed Sep. 26, 2018, the entire contents of which is incorporated herein by reference.

TECHNICAL FIELD

This disclosure relates to a servovalves and in particular to single stage flapper type servovalves.

BACKGROUND

Servo valves are well-known in the art and can be used to control how much fluid is ported to an actuator. A single stage flapper type servovalve includes a valve housing having a cavity which receives a pair of opposed nozzles, between which is arranged a flapper which is coupled to a flapper actuator such as a torque motor. The servovalve housing further comprises three ports which allow communication of the working fluid of the servovalve to the nozzles. One of the ports is typically called a control port and its function is to communicate fluid to the actuator (not shown). Deflection of the flapper by means of the flapper actuator changes the amount of fluid that is communicated to the actuator.

Typically the valve housing is formed of aluminium, and the nozzles are formed of stainless steel. The nozzles must be located with very high precision relative to the valve housing in order to assure proper functioning of the valve. This can be challenging in certain operational conditions.

SUMMARY

From a first aspect, the present disclosure provides a single stage flapper type servovalve. The servovalve comprises a valve housing comprising a bore, a pair of opposed nozzles arranged in the bore and a flapper element arranged between the pair of nozzles. The valve housing further comprises a plurality of fluid ports for communicating a working fluid to and from the nozzles and in fluid communication with the housing bore. The valve housing and the nozzles are both made from a stainless steel material.

The valve housing and the nozzles may be made from stainless steels having the same or a similar coefficient of thermal expansion. By similar in this context may be meant within +/−10%, optionally within +/−5%.

In some embodiments, the valve housing and the nozzles may be made from the same stainless steel.

The servovalve may further comprise a torque motor mounted to the valve housing

In embodiments, a stainless steel connecting tube may be brazed or welded between the valve housing and the torque motor, the flapper element extending through the connecting tube.

The servovalve may further comprise respective plugs closing the ends of the valve housing bore. The plugs may also be formed of a stainless steel, optionally having the same or a similar coefficient of thermal expansion to that of the valve housing.

The disclosure also provides a single stage flapper type servovalve housing comprising a bore for receiving a pair of opposed nozzles therein and a plurality of fluid ports in fluid communication with the housing bore. The valve housing is made from stainless steel.

In any of the above arrangements, the valve housing may further comprise a plurality of mounting bores, for receiving fasteners for mounting the valve housing to a surface. The mounting bores are optionally at the housing periphery.

The mounting bores may be formed as tubular elements attached to a further portion of the valve housing by means of one or more connecting elements, for example to a portion of the valve housing in which is formed the valve bore and/or the ports.

The connecting elements may comprise a plurality of connecting arms.

The connecting arms may form a lattice structure with voids formed between the connecting arms and the further portion of the valve housing, for example the portion of the valve housing in which is formed the valve bore and/or the ports.

The servovalve housing may be formed with internal voids.

The servovalve housing may be formed by an additive manufacturing technique.

The disclosure also provides a method of manufacturing a single stage flapper type servovalve housing comprising: a bore for receiving a pair of opposed nozzles therein and a plurality of fluid ports in fluid communication with the housing bore. The method comprises additively manufacturing the valve housing from a stainless steel material.

The method may further comprise brazing or welding one end of a stainless steel connecting tube to the valve housing for attachment to a torque motor.

The disclosure also provides a method of assembling a single stage flapper type servovalve as described above comprising manufacturing the servovalve housing by the above method and brazing or welding the other end of the connecting tube to the torque motor, for example to a torque bridge of the torque motor.

BRIEF DESCRIPTION OF DRAWINGS

Some embodiments of the present disclosure will now be described, by way of example only, with reference to the accompanying drawings in which.

DETAILED DESCRIPTION

With reference to FIGS. 1 to 5, a single stage flapper type servovalve 2 is illustrated.

The servovalve 2 comprises a valve housing 4 to which is mounted a flapper actuator 6, in particular a torque motor 6.

Figure 1:
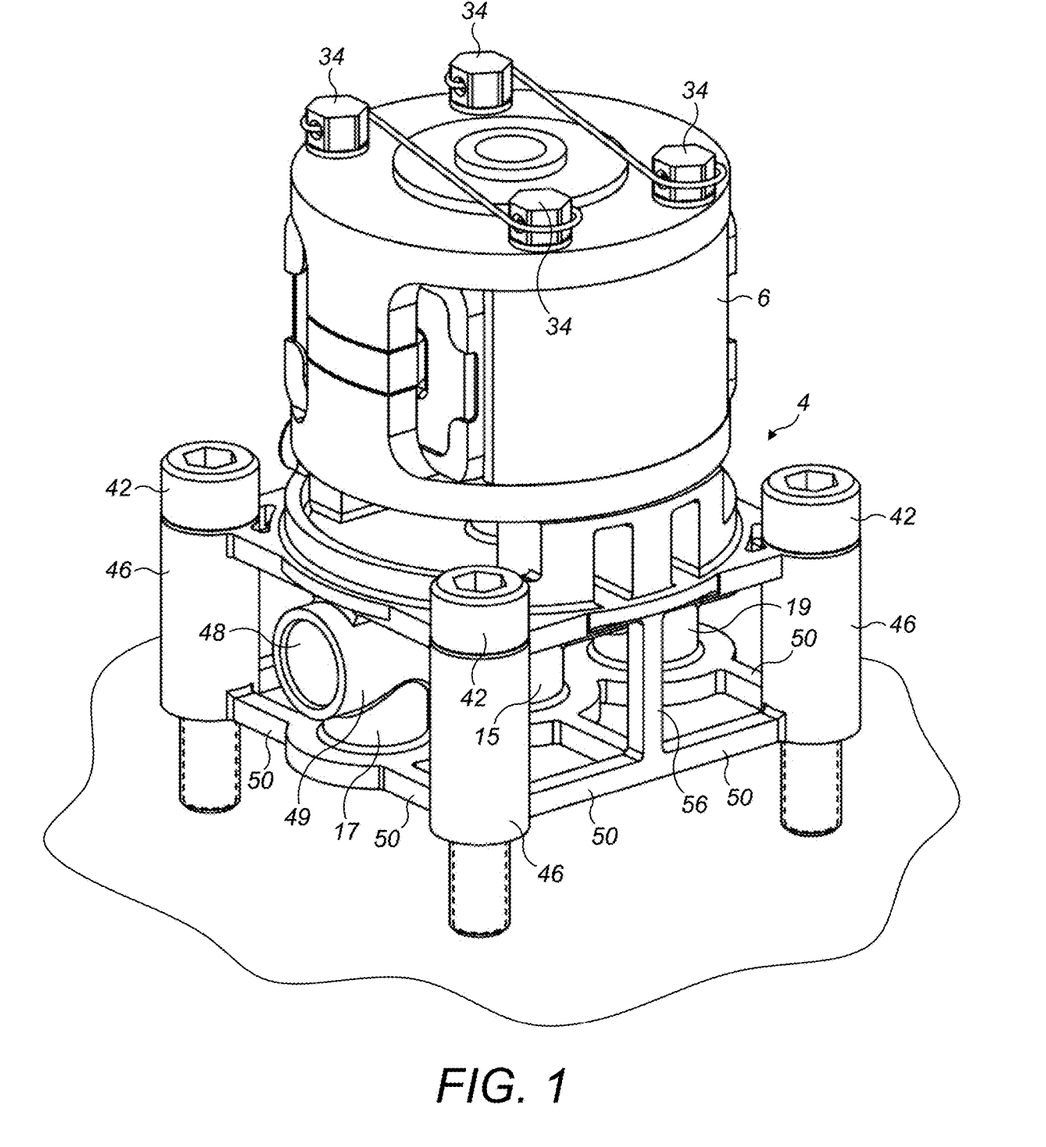
FIG. 1 illustrates a first embodiment of a single stage flapper type servovalve in accordance with the disclosure.
Figure 2:
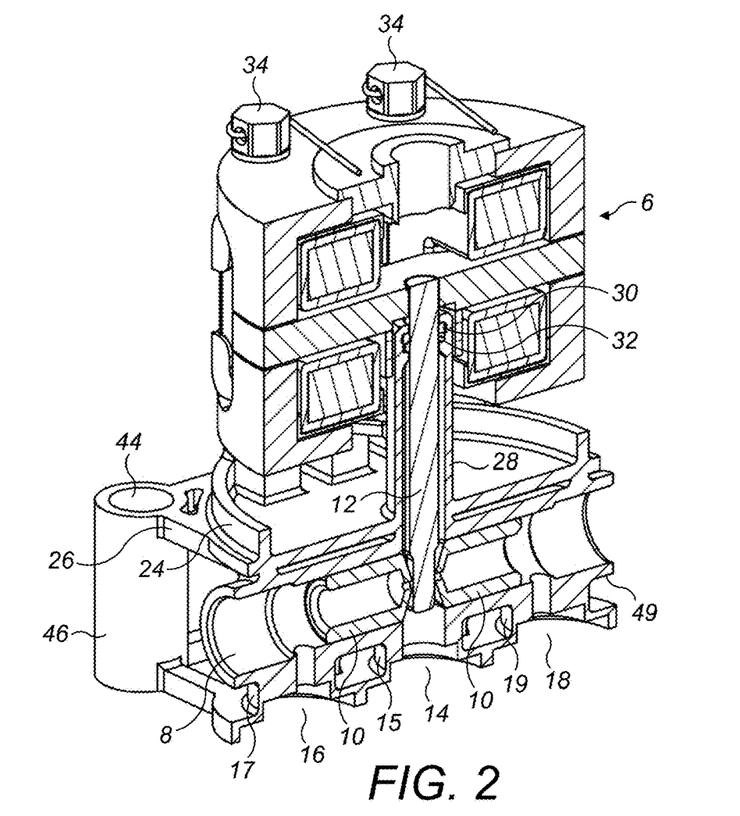
FIG. 2 shows a vertical section through the servovalve of FIG. 1.
Figure 5:
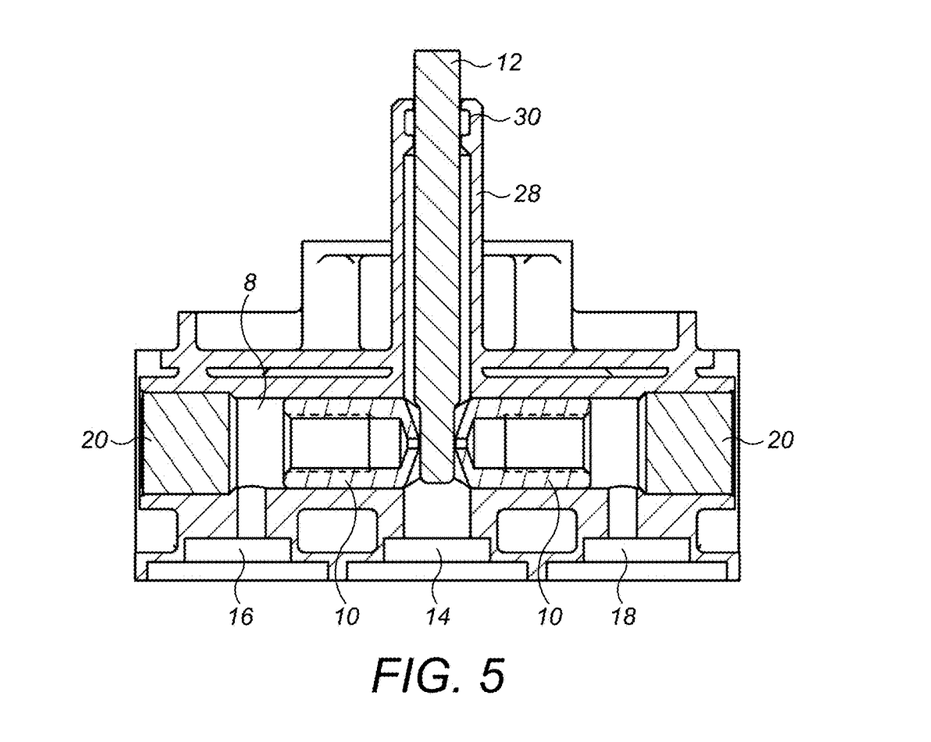
FIG. 5 shows a vertical cross section through the valve housing of FIG. 3.

As can be seen from FIGS. 2 and 5, the valve housing 4 comprises a bore 8 in which are fitted, in particular press fitted a pair of opposed nozzles 10. A flapper element 12 which is coupled to the torque motor 6 is arranged between the pair of nozzles 10. The valve housing 4 further comprises a plurality of fluid ports 14, 16, 18 for communicating a working fluid to and from the nozzles 10. The ports 14, 16, 18 are in fluid communication with the housing bore 8. The central port 14 is typically called a control port and its function is to communicate working fluid to an actuator (not shown).

The bore 8 is closed at its opposed ends by plugs 20 which may be press fitted into the ends of the bore 8.

This general type of servovalve is well known in the art, being used in a wide variety of aircraft control systems, for example in fuel and air management systems for operating engine fuel metering valves, active clearance control valves, bleed valves and so on.

However, the servovalve 2 of the disclosure departs from known servovalves in a number of significant respects which will be described further below.

As mentioned earlier, in prior art single stage flapper type servovalves, the valve housing 4 is typically made from aluminium. This is because the servovalve will typically be used in aircraft systems, where weight is of concern, and for ease of manufacture. However, the nozzles 10 are formed of stainless steel and must be positioned very accurately in the in valve housing.

The use of aluminium as a valve housing material, while being advantageous in many respects has been recognised as being not ideal in others. For example, Aluminium may lose its physical properties at elevated temperatures. Aluminium alloy 6061 T651 which is a material typically used for servovalve housings may lose up to 50% of its Ultimate Tensile Stress and may suffer fatigue after as little as 0.5 hours exposure to temperatures of 260° C. Moreover, the nozzles 10 have to be very accurately positioned in the bore 8 to ensure proper operation of the servovalve 2 without any degradation in performance over time. As the nozzles 10 are generally press fitted within the bore 8, due to the difference in the coefficient of thermal expansion of the nozzle and housing materials, the interference fit may relax too much at higher temperatures resulting in movement of the nozzles 10.

To overcome or at least mitigate these potential drawbacks, in accordance with the disclosure, the servovalve housing 4 and the nozzles 10 are both made from a stainless steel material. Thus embodiments of the disclosure have the advantage that the servovalve 2 may be used in higher temperature environments without weakening the valve housing 4. Moreover, as the coefficients of thermal expansion of the valve housing 4 and the nozzles 10 will be much closer to one another, an improved interference fit will be formed between the valve body 4 and the nozzles 10 which will not significantly loosen during use, even at elevated temperatures.

In embodiments of the disclosure the valve housing 4 and the nozzles 10 are made from stainless steels having the same or similar coefficients of thermal expansion. By similar in this context may be meant within +/−10%, or, more narrowly within +/−5%. This will have the advantage of eliminating or substantially reducing any loss in press fit at high temperatures and will allow looser tolerances in the internal diameter of the bore 8 and the external diameter of the nozzles 10, where previously very tight tolerances had to be met due to the very different coefficients of thermal expansion of the bore and nozzle materials. In some embodiments, the valve housing 4 and the nozzles 10 may be made from the same stainless steel material, for example from A 286.

In embodiments of the invention, the plugs 20 sealing the bore 8 may also be made from a stainless steel material, for example one having a coefficient of thermal expansion similar to (as discussed above) or equal to that of the valve housing 4. The plugs 20 may be therefore be made from made from the same stainless steel material as the valve housing 4, for example from A286.

The valve housing 4 comprises a mounting 22 for the torque motor 6. As can be seen from FIG. 3, in this embodiment, the mounting 22 comprises a mounting boss 24 upstanding from a top plate 26 of the valve housing 4. A chimney 28 is formed integrally with and extends upwardly from the valve housing 4. As can be seen from FIG. 2, the flapper element 12 of the servovalve extends through the chimney 28. The chimney 28 is formed with a recess 30 at its upper end for receiving a seal, for example an O-ring seal 32 which seals against the upper end of the flapper 12 to seal the torque motor 6 from the fluid in the valve housing 4.

Figure 3:
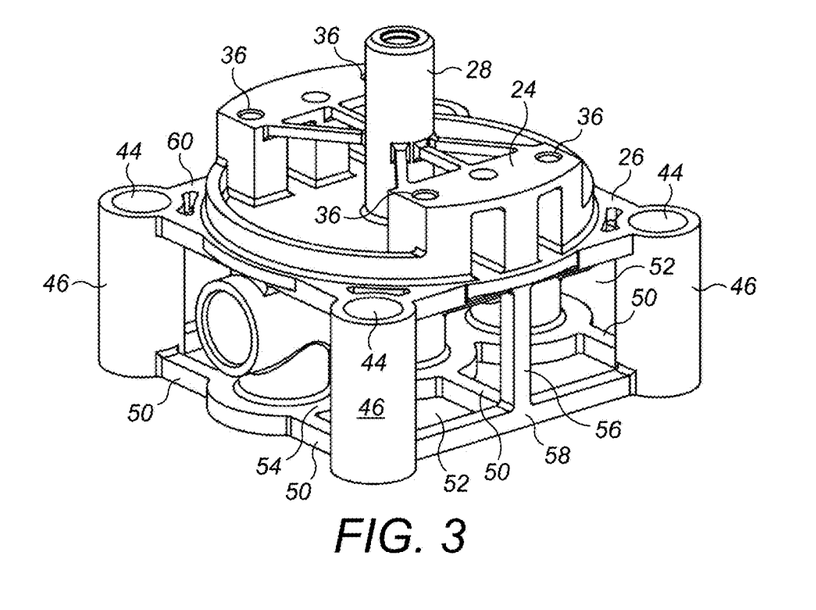
FIG. 3 shows a perspective view of the valve housing of the servovalve of FIGS. 1 and 2.
Figure 4:
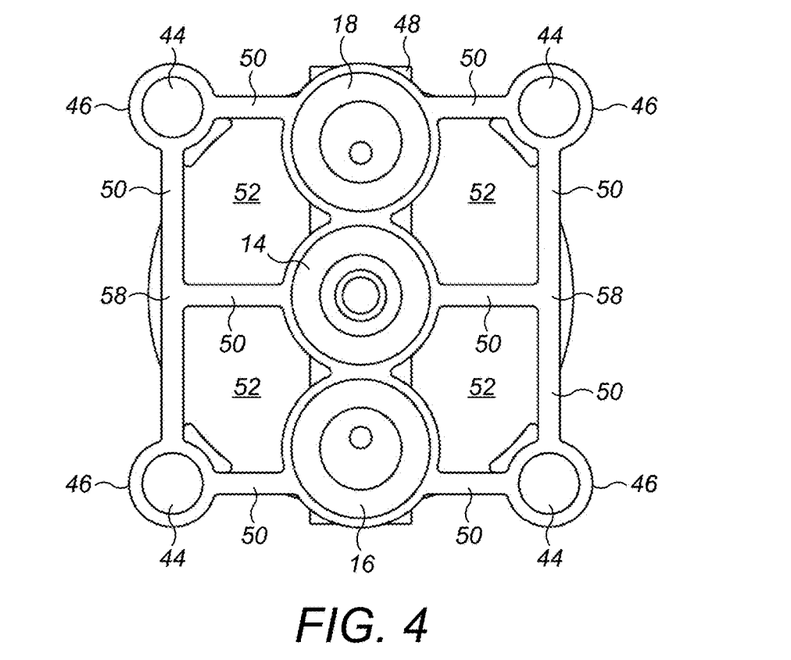
FIG. 4 shows a bottom view of the valve housing of FIG. 3.

The torque motor 6 is attached to the valve housing 4 by means of fasteners 34 which extend into receiving bores 36 formed in the upper surface of the mounting boss 24.

The servovalve 2 is mounted to a support surface 40 (FIG. 1) by means of fasteners 42, for example screw fasteners which are received in mounting bores 44 formed at the periphery of the valve housing 4. In this embodiment, the mounting bores 44 are formed in tubular elements 46. The tubular elements 46 are attached at their upper end to the top plate 26 of the valve housing 2 by webs 60. The tubular elements 46 are attached to a central portion 48 of the valve housing 2 in which is formed the valve bore 8 and the ports 14, 16, 18 by a network of connecting elements 50, in this embodiment a plurality of connecting arms 50. This creates a lattice-like structure for the valve body 4, with voids 52 being formed within the structure between the peripheral connecting tubes 46 and the central portion 48 of the valve housing 2. This acts significantly reduce the weight of the valve housing 2, which is of particular importance when using stainless steel as the housing material. The central portion 48 itself has a generally tubular construction, with the valve bore 8 being formed by a tubular wall structure 49 and the ports 14, 16, 18 being formed by spaced apart tubular elements 15, 17, 19 extending from the valve bore wall 49.

In the embodiment of FIGS. 1 to 5, the connecting arms 50 are arranged in a rectangular lattice arrangement joining the connecting tubes to each other and to a lower portion 54 of the central portion 48 of the valve housing 4, surrounding the valve ports 14, 16, 18. Vertical connecting arms 56 extend upwardly on either side of the valve housing 4 from the nodes 58 formed between the connecting arms 50 which extend generally parallel to the axis A of the bore 8 to connect to the top plate 26 of the valve housing 4. This provides a stiff, yet light valve housing construction.

Figure 6:
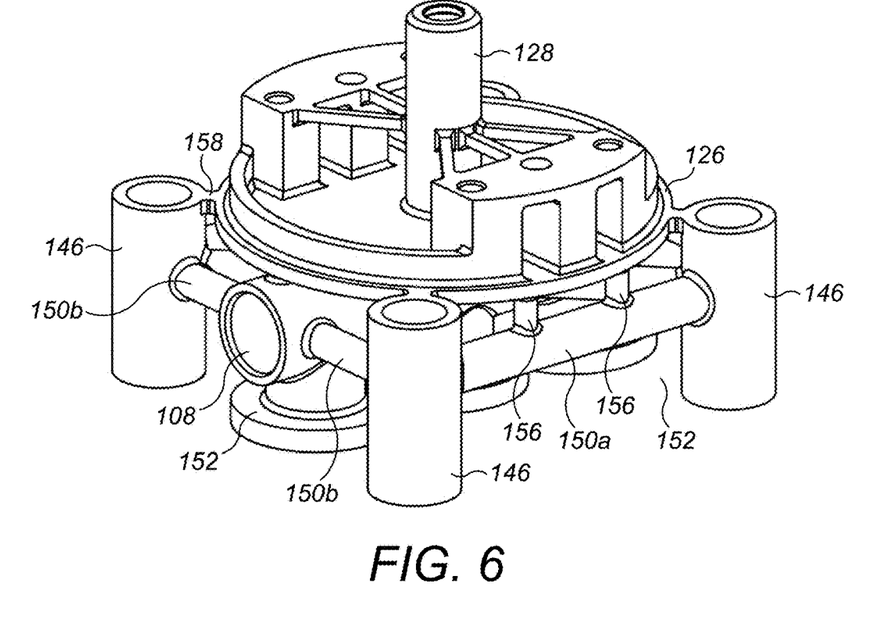
FIG. 6 shows a perspective view of a further embodiment of valve housing in accordance with the disclosure.
Figure 7:
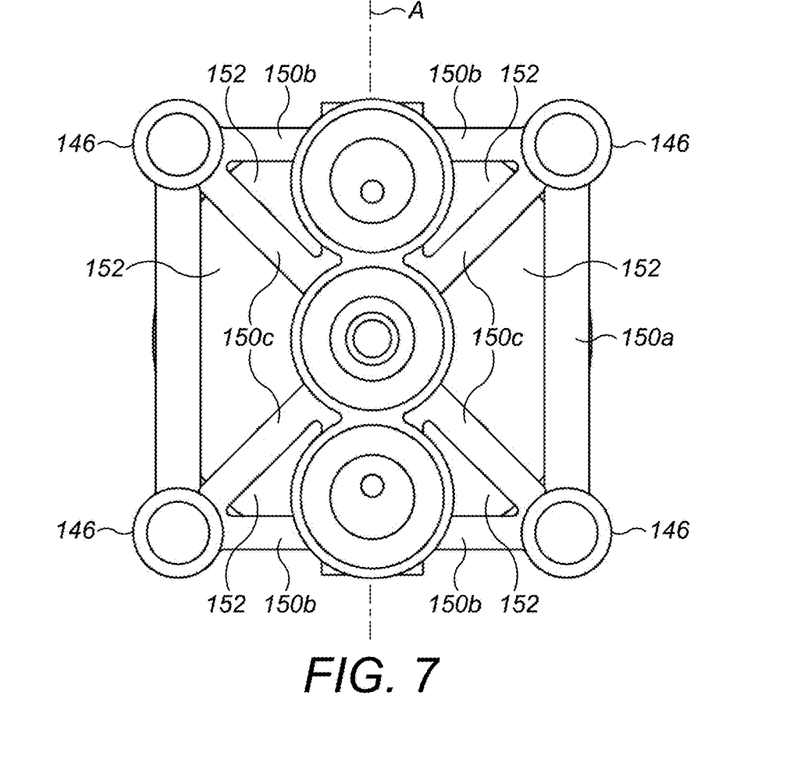
FIG. 7 shows a bottom view of the valve housing of FIG. 6.

It will be appreciated that other forms of lattice structure may be employed. A further embodiment in accordance with the disclosure, which incorporates such a structure, is illustrated in FIGS. 6 and 7. The structure of the valve housing 104 is generally the same as that of the valve housing 4 of the first described embodiment, apart from the lattice structure. Only the lattice structure will therefore be described in detail below.

In this embodiment, the peripheral tubular elements 146 arranged on either side of the central portion 148 of the valve housing 8 are connected together by first connecting arms 150a which extend generally parallel to the axis of the bore 108 of the valve housing 104. Those connecting tubular elements 146 are then connected to an end mid-height portion 154a of the central portion 148 of the valve housing, generally in line with the axis A of the valve housing bore 108, by second, shorter connecting arms 150b. The tubular elements 146 are further connected to a central mid-height portion 154b by diagonally extending arms 150c. Relatively short vertical connecting arms 156 connect the first connecting arms 150a to the top plate 126 of the valve housing 104. The top ends of the connecting elements 146 are also attached to the top plate 126 by webs 160.

This structure therefore also defines large voids 152 in the valve housing 104, thereby significantly reducing its weight.

The valve housing 4, 104 of the above described embodiments may be made by any suitable manufacturing technique. However, a particularly advantageous method of manufacturing for use in the present disclosure is additive manufacturing. Additive manufacturing is a technique in which successive layers of material are deposited one upon the other to create a desired shape. An example of such a process which may be usefully employed in producing servovalve housings in accordance with the disclosure is laser powder bed fusion. Additive manufacturing has the advantage that it allows relatively complicated shapes to be produced. Stainless steel is a material which is capable of use in such a process.

The additively manufactured housing 4, 104 may be produced to a near-net shape and then finish machined to provide various features such as the bore 8.

The use of stainless steel as a valve housing material may also allow modification and simplification of other aspects of the servovalve.

Figure 8:
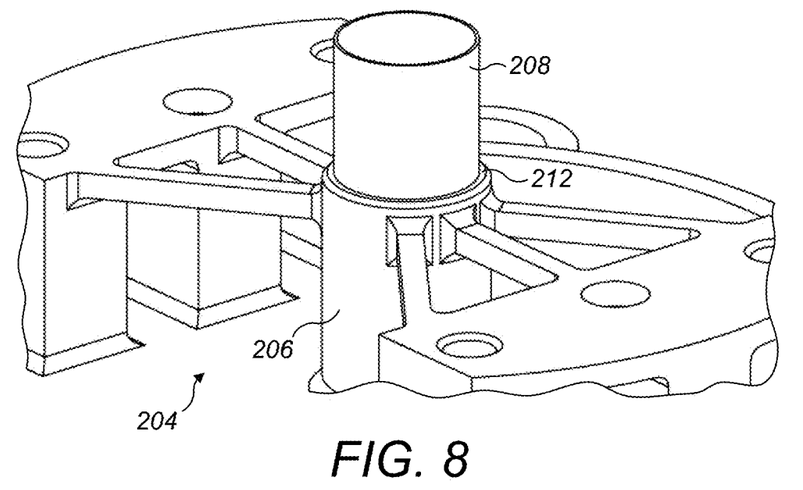
FIG. 8 shows a detail of a further embodiment of valve housing in accordance with the disclosure.
Figure 9:
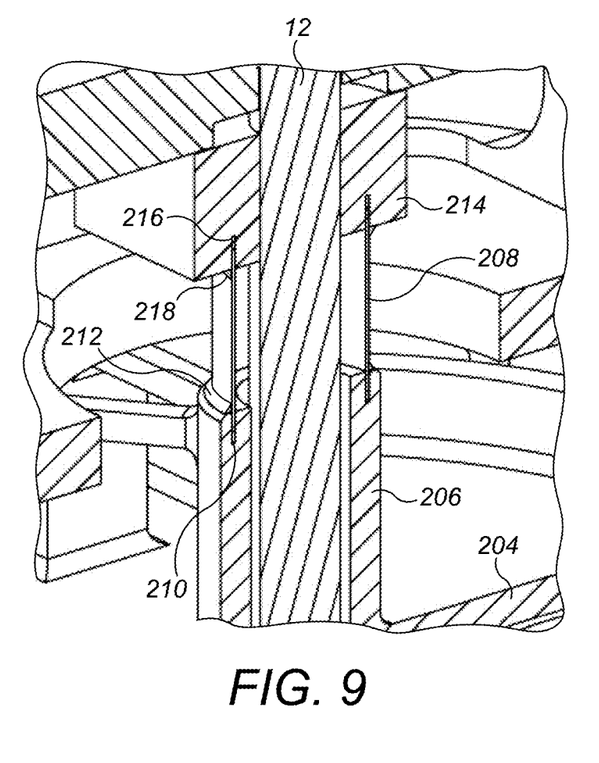
FIG. 9 shows a detail of the attachment of the valve housing of FIG. 8 to a torque motor.

As described briefly above, in a traditional servovalve construction, a chimney 28 is integrally formed with the servovalve housing 4 and the chimney 28 is sealed to the flapper element 12 by a seal to avoid leakage of fluids from the servovalve housing 4 into the torque motor 6. In the embodiment of FIGS. 8 and 9, however, the valve housing 204 is provided with a much shorter chimney 206 and a separate tube 208 is attached to the top of the chimney 206. The tube 208 may be relatively thin, for example between 0.05 mm and 0.15 mm thick. The wall thickness will be determined to a large extent by the operating pressure of the servovalve, so for an air servovalve the thickness may be about 0.05 mm, but for a fuel application where pressures would be higher, the thickness may be greater, for example about 0.08 mm to about 0.1 mm. The thickness may also be dependent to some extent on the total armature stiffness of the torque motor. The precise thickness can be determined as necessary for any particular application. The tube 208 may, for example be received in a groove 210 in the top of the chimney 206. The tube 208 is secured to the chimney 206 by a braze or weld 212.

The upper end of the tube 208 is similarly attached to the torque motor 6. In this embodiment the tube 208 is attached to a torque bridge 214 of the torque motor 6, to which the flapper element 12 is attached. The tube 208 may be received in a groove 216 in the bottom surface of the torque bridge 214 and secured by a braze or weld 218. While fluid from the servovalve housing 204 will be able to enter the lower end of the tube 208, it will not be able to exit the upper end of the tube 208 due to the close fit between the flapper element 12 and the torque bridge and the braze or weld 218.

It will be seen from the above that various embodiments of the disclosure have distinct advantages over prior art servovalves. By using stainless steel as the material of the servovalve housing 4, the servovalve may potentially be used at higher operating temperatures, thereby potentially expanding the range of applications for such valves. The improved strength of the housing 4 due to its manufacture from stainless steel also means that the servovalve may be used not only at higher temperatures, but also at higher pressures.

By making the nozzles 10 and valve housing 4 of stainless steel, optionally the same material, the problem of potential loss of press fit at elevated temperatures is prevented. It also means that it may be possible to increase the tolerance on the bore and nozzle diameters, thereby facilitating manufacture and assembly of the servovalve 2. This also applies to the plugs 10 closing the bore 8 of the housing 4.

By designing the valve housing 4 with a lattice type construction, a significant reduction of weight may be achieved. In fact, it may be possible to produce housings which are lighter that hitherto known aluminium based housings, for example by as much as 30% lighter.

The use of an additive manufacturing process will also be advantageous as it will all allow intricate shapes of housing to be produced. Moreover, in embodiments, the valve housing 4 may comprise internal voids which may further reduce the weight of the housing. For example, the individual tubular structures and connecting arms of the valve housing 4 may comprise voids. Such structures may be created using additive manufacturing, but not by conventional techniques such as casting or machining.

It will be appreciated that the above description is of exemplary embodiments only and that modifications may be made thereto without departing from the scope of the disclosure.

The invention claimed is:

1. A single stage flapper type servovalve comprising:
a valve housing comprising a bore;
a pair of opposed nozzles arranged in the bore;
a flapper element arranged between the pair of nozzles; and
a torque motor mounted to the valve housing;
the valve housing further comprising a plurality of fluid ports for communicating a working fluid to and from the nozzles and in fluid communication with the housing bore;
wherein the valve housing and the nozzles are both made from a stainless steel material; and
the valve housing further comprising a stainless steel connecting tube between the valve housing and the torque motor, the flapper element extending through the connecting tube;
wherein the connecting tube is received in a first groove in the valve housing and secured to the valve housing by a braze or weld and wherein the connecting tube is received in a second groove in a torque bridge of the torque motor and secured to the torque bridge by a braze or weld.

2. A single stage flapper type servovalve as claimed in claim 1, wherein the valve housing and the nozzles are made from stainless steels having the same or a similar coefficient of thermal expansion.

3. A single stage flapper type servovalve as claimed in claim 2, wherein the valve housing and the nozzles are made from the same stainless steel.

4. A single stage flapper type servovalve as claimed in claim 1, further comprising respective plugs closing the ends of the valve housing bore, the plugs also being formed of a stainless steel.

5. A single stage flapper type servovalve as claimed in claim 1, wherein the valve housing is formed by an additive manufacturing technique.

6. A single stage flapper type servovalve comprising:
a valve housing comprising a bore;
a pair of opposed nozzles arranged in the bore; and
a flapper element arranged between the pair of nozzles;
the valve housing further comprising a plurality of fluid ports for communicating a working fluid to and from the nozzles and in fluid communication with the housing bore;
wherein the valve housing and the nozzles are both made from a stainless steel material; and
wherein the valve housing further comprises a plurality of mounting bores at its periphery, for receiving fasteners for mounting the valve housing to a surface;
wherein the mounting bores are formed as tubular elements attached to a central portion of the valve housing in which is formed the valve bore and/or the ports, by means of one or more connecting elements; and
wherein the connecting elements further comprise a plurality of connecting arms that directly connect the mounting bores, wherein the connecting elements form a lattice structure with voids formed between the connecting arms and the central portion of the valve housing.

\* \* \* \* \*